(12) United States Patent
Sun et al.

(10) Patent No.: US 8,817,643 B1
(45) Date of Patent: Aug. 26, 2014

(54) METHOD AND APPARATUS FOR MONITORING A RADIO LINK IN A COMMUNICATION SYSTEM

(75) Inventors: Yakun Sun, Sunnyvale, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 575 days.

(21) Appl. No.: 13/155,985

(22) Filed: Jun. 8, 2011

Related U.S. Application Data

(60) Provisional application No. 61/355,031, filed on Jun. 15, 2010.

(51) Int. Cl.
*H04W 24/04* (2009.01)
(52) U.S. Cl.
CPC .................................. *H04W 24/04* (2013.01)
USPC ........................................................ 370/252
(58) Field of Classification Search
CPC ................................................. H04W 24/04
USPC ........................................................ 370/252
See application file for complete search history.

(56) References Cited

U.S. PATENT DOCUMENTS

2008/0032628 A1* 2/2008 Vehvilainen et al. ......... 455/41.2
2010/0297963 A1* 11/2010 Rofougaran et al. ........... 455/88

OTHER PUBLICATIONS

S.A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

"IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1," *The Institute of Electrical and Electronics Engineers, Inc.*, Feb. 28, 2006.

"IEEE Std 802.16 2009 (Revision of IEEE Std. 802.16-2004), IEEE Standard for Local and metropolitan area networks: Part 16: Air Interface for Broadband Wireless Access Systems," *The Institute of Electrical and Electronics Engineers, Inc.*, May 29, 2009.

"IEEE P802.11 n™/D3.00, Draft Standard for Information Technology—Telecommunications and information exchange between systems-Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11 n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

\* cited by examiner

*Primary Examiner* — Melvin Marcelo

(57) ABSTRACT

In a method for monitoring a radio link in a wireless communication system, a plurality of short term radio link quality values based on one or more measured channel matrices is determined. A long term radio link quality value is determined from the plurality of the short term radio link quality values. Additionally, radio link failure or recovery is indicated, when appropriate, based on the long term radio link quality value.

25 Claims, 6 Drawing Sheets

METHOD AND APPARATUS FOR MONITORING A RADIO LINK IN A COMMUNICATION SYSTEM

CROSS-REFERENCES TO RELATED APPLICATIONS

This disclosure claims the benefit of U.S. Provisional Patent Application No. 61/355,031, filed on Jun. 15, 2010, which is hereby incorporated by reference herein in its entirety.

FIELD OF THE DISCLOSURE

The present disclosure relates generally to communication networks and, more particularly, to monitoring a radio link in a wireless network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless communication channels are often characterized by time-varying conditions due to factors such as fading, shielding, interference and user mobility. In some cases, changes in channel quality are severe enough to cause a connection between communication devices utilizing the channel to be lost. Therefore, in some communication systems, it is useful for communication devices to monitor the quality of the radio link being utilized in order to determine whether a connection failure has occurred, or, alternatively, if a failed connection has recovered. Various radio link failure detection and recovery mechanisms are utilized by communication systems to efficiently manage network resources.

SUMMARY

In one embodiment, a method for monitoring a radio link in a wireless communication system includes determining a plurality of short term radio link quality values based on one or more measured channel matrices. The method also includes determining a long term radio link quality value from the plurality of the short term radio link quality values. The method further includes indicating that the radio link has failed or has recovered, when appropriate, based on the long term radio link quality value.

In another embodiment, an apparatus for monitoring a radio link in a wireless communication system is configured to determine a plurality of short term radio link quality values based on one or more measured channel matrices. The apparatus is also configured to determine a long term radio link quality value from the plurality of the short term radio link quality values. The apparatus is further configured to indicate that the radio link has failed or has recovered, when appropriate, based on the long term radio link quality value.

DETAILED DESCRIPTION

Figure 1:
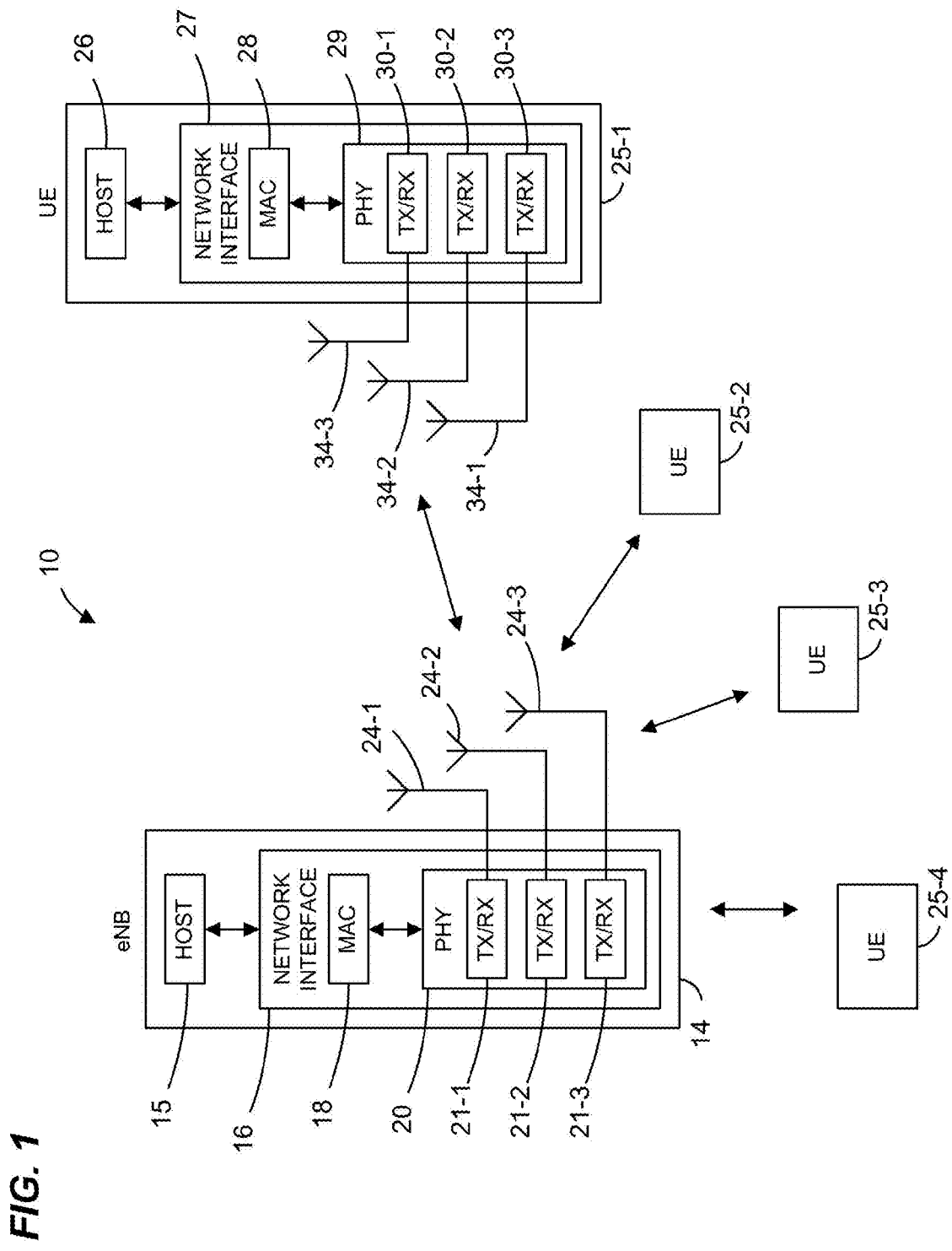
FIG. 1 is a block diagram of an example wireless communication network in which radio link monitoring techniques are utilized, according to an embodiment.

In embodiments described below, a wireless network device such as an evolved node base device (eNB) of a communication network transmits to and receives from one or more other wireless network devices, such as a user equipment device (UE). eNB and UE correspond to terminology used in the $3^{rd}$ Generation Partnership Project Long Term Evolution (3GPP LTE) Standard. The apparatus and methods discussed herein, however, are not limited to 3GPP LTE networks. Rather, the apparatus and methods discussed herein may be utilized in other types of wireless communication networks as well. For instance, another example system that may utilize embodiments of apparatus and methods described herein is a technology promulgated by the Worldwide Interoperability for Microwave Access (WiMAX) Forum (such systems conform to the Institute for Electrical and Electronics Engineers (IEEE) 802.16e Standard). In WiMAX, a base station (BS) corresponds to the eNB of 3GPP LTE, and a mobile station (MS) corresponds to the UE. In other embodiments, other types of systems utilize embodiments of apparatus and methods described herein such as communication systems that conform to the IEEE 802.16 Standard, wireless local area network (WLAN) systems such as systems that conform to the IEEE 802.11n Standard, etc. For ease of explanation, the description below refers to eNBs and UEs.

According to an embodiment, a communication channel (or radio link) utilized for communication between an eNB and a UE is characterized by variations in channel conditions over time due to, for example, time varying multipath or shadow fading, or interference from nearby communication channels and devices. Additionally, in embodiments where UE is a mobile device, the communication channel conditions also vary due to the changing location of the UE relative to the eNB. Accordingly, in various embodiments and/or scenarios, the UE is configured to monitor the radio link to determine if connection failure has occurred, or alternatively, if connection for a failed link has recovered. In an embodiment, in response to determining that a link has failed, the UE is configured to follow certain procedures to, for example, attempt to reconnect to the eNB or initiate handover to another eNB. Thereby, communication systems utilizing various embodiments of the present disclosure are able to efficiently manage various radio links and minimize unnecessary interference, save energy, etc.

The 3GPP LTE Standard defines radio link failure or recovery as inability or ability, respectively, to successfully receive a defined control signal which is not actually transmitted. Therefore, in various embodiments and/or scenarios, a network interface of a communication device utilizes radio monitoring techniques described below to predict whether a defined control signal would have been successfully received under the current channel conditions. For this purpose, in an embodiment, the network interface utilizes a measured channel matrix to determine a signal to interference plus noise ratio (SINR) associated with the current channel conditions. Utilizing SINR as a radio link monitoring metric allows a UE to accurately and promptly predict successful reception of a control signal in various propagation channel types (e.g., a frequency flat or slow fading channel vs. fast fading channel) and also takes into account the particular receiver of the UE by predicting successful reception of a control signal by the particular receiver, according to various embodiments and/or scenarios. Further, in various embodiments and/or scenarios, the radio link monitoring techniques described below allow a UE to detect radio link failure (or recovery) quickly, while avoiding "false alarm" situations in which a radio link failure (or recovery) is detected in response to a momentary change in channel conditions. In embodiments that do not utilize the 3GPP LTE Standard, a radio link failure or recovery is defined in other suitable ways.

FIG. 1 is a block diagram of an example wireless communication network 10 in which radio link monitoring techniques of the present disclosure are utilized, according to an embodiment. An eNB 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the eNB 14 can include different numbers (e.g., 1, 2, 4, 5, etc.) of transceivers 21 and antennas 24 in other embodiments.

The network 10 includes a plurality of UEs 25. Although four UEs 25 are illustrated in FIG. 1, the network 10 can include different numbers (e.g., 1, 2, 3, 5, 6, etc.) of UEs 25 in various scenarios and embodiments. The UE 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In various embodiments, one or more of the UEs 25-2, 25-3, and 25-4 has a structure the same as or similar to the client station 25-1.

In various embodiments, one or more of the PHY processing unit 20 and/or the MAC processing unit 18 of the eNB 14, the PHY processing unit 29 and/or the MAC processing unit 28 of the UE 25-1, and/or PHY processing units and/or MAC processing units of the other UEs 25 are configured to utilize radio link monitoring techniques described below. For ease of explanation, the PHY processing unit 29 of the UE 25-1 will be described below as utilizing radio link monitoring techniques in communicating with the eNB 14. But in other embodiments, the eNB 14 and/or other UEs 25 additionally or alternatively utilize the radio link monitoring techniques.

Figure 2:
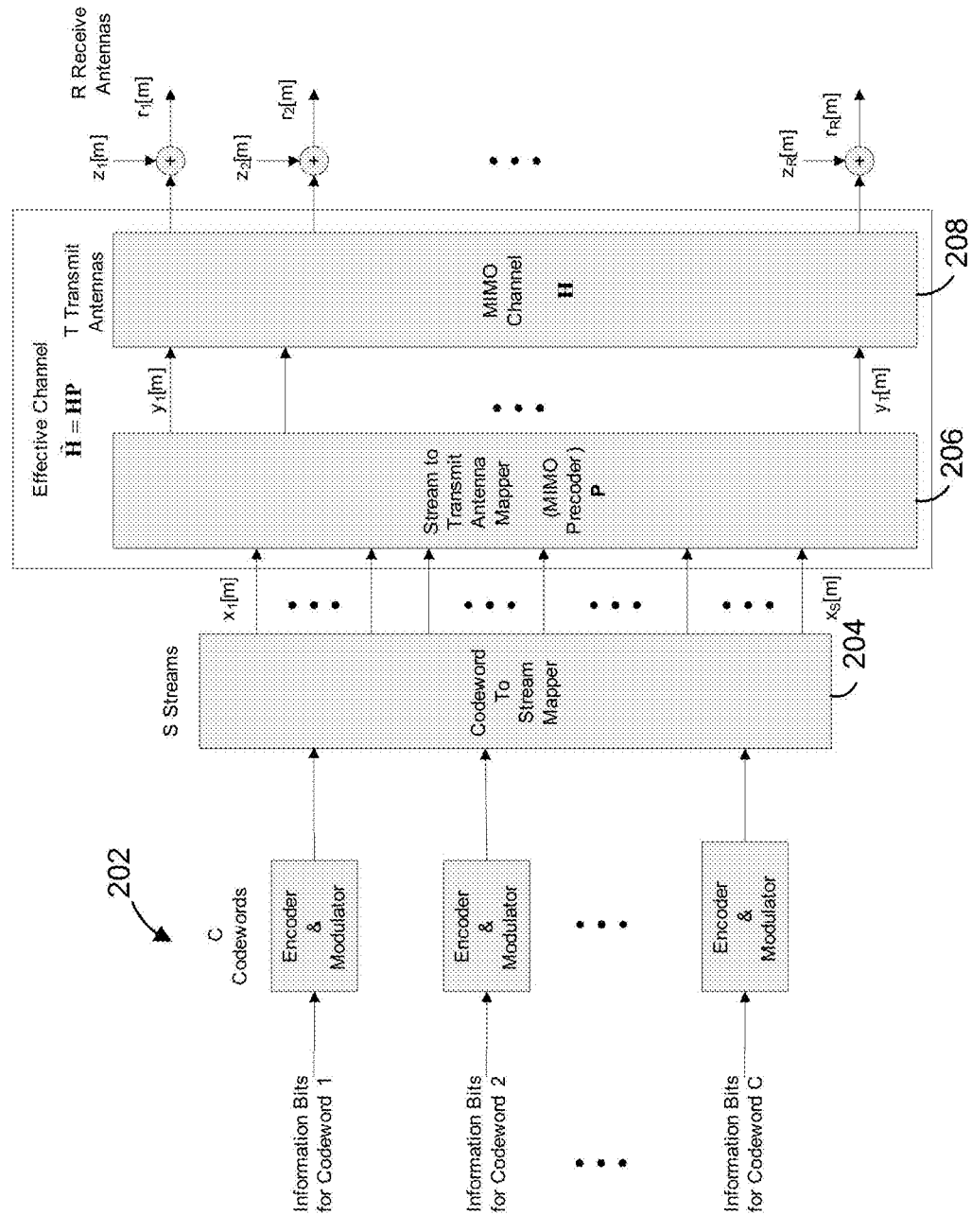
FIG. 2 is a block diagram of an example model of a communication system in the context of which radio link monitoring techniques are utilized, according to an embodiment.

FIG. 2 is a block diagram of an example model 200 of a communication system in the context of the radio link monitoring techniques described herein, according to an embodiment. According to the model, T is the number of transmit (Tx) antennas utilized by an eNB for communication with a UE, R is the number of the receive (Rx) antennas at the UE, and S is the number of spatial streams that the eNB utilizes for transmission to the UE. The example model 200 includes one or more modulation and coding blocks 202 at which one or more data streams ("code words") are encoded and modulated according to a modulation scheme, followed by a codeword to stream mapper block 204 at which the encoded and modulated code words are mapped to one or more spatial streams according to a multiple input, multiple output (MIMO) mode. At block 206, the one or more spatial streams are mapped to the T Tx antennas by a pre coding matrix P (R×S). Block 208 represents a MIMO channel characterized by a measured channel matrix H (R×T). An effective channel matrix H̃ (R×S) is defined as a product of the pre coding matrix P and the measured channel matrix H.

Referring now to FIG. 1, the PHY processing unit 29 is configured to perform channel measurements at multiple times t in order to generate N effective channel matrices H̃(t). Each time t corresponds to, for example, one transmit time interval (TTI), or one subframe in an embodiment in which the UE 25-1 is configured to operate according to the 3GPP LTE Standard. Other suitable units of time are utilized in other embodiments. Further, in one embodiment, in which orthogonal frequency division multiplexing (OFDM) is utilized, N corresponds to the multiple OFDM tones utilized for transmission. Alternatively, in another embodiment, in which single carrier time division multiplexing (TDM) is utilized, N corresponds to the number of sampled symbols. In some embodiments and/or scenarios, N does not correspond to the total number of OFDM tones or TDM symbols, but corresponds to a subset of the total number of OFDM tones or TDM symbols. For example, in one embodiment utilizing OFDM, pilot tones are available for channel estimation at only some OFDM carrier frequencies. Alternatively or in addition, only a subset of all possible H matrices is utilized in order to reduce computational complexity, according to another embodiment.

In an embodiment, the H̃(t) effective channel matrices are processed by an SINR unit (e.g., included in an equalizer configured to generate SINR values) to produce M corresponding SINR(t) values, wherein M is the product of the number of channel matrices (N) and the number of spatial streams (S). In an embodiment, the multiple SINR(t) values generated by the equalizer are mapped to an effective $SINR_{eff}(t)$ value that is then used for further processing and radio link failure or recovery detection. For example, in an embodiment, exponential effective SNR mapping (EESM) is used to map the multiple SINR(t) values to an effective $SINR_{eff}(t)$ value according to:

$$SINR_{eff}(t) = -\beta \log\left(\frac{1}{M}\sum_{m=1}^{M} e^{-SINR_{eff}(t)/\beta}\right) \qquad \text{Equation 1}$$

where β is a parameter which depends on the particular modulation scheme being utilized. $SINR_{eff}(t)$ is then, for example, averaged over time and compared to a threshold to detect a radio link failure or recovery, in an embodiment.

Alternatively, because radio link failure generally occurs at low SINR values, a linear average is used to map the multiple SINR(t) values to an effective $SINR_{eff}(t)$ value, thereby reducing computational complexity associated with determining an effective SINR value, according to an embodiment. That is, according to this embodiment, the effective SINR at each time t value is given by:

$$SINR_{eff}(t) = \frac{1}{M}\sum_{m=1}^{M} SINR_m(t) \qquad \text{Equation 2}$$

In some other embodiments, the SINR(t) values are first mapped to a new set of values, and processing is done on the new set of values to determine the effective $SINR_{eff}(t)$ value for each time t. In one such embodiment, for example, an average of the new set of values is calculated for each time t to determine an effective $SINR_{eff}(t)$ value. Other suitable techniques are utilized to determine an effective $SINR_{eff}(t)$ value based on the multiple SINR(t) values for each time t in other embodiments.

In various embodiments, the PHY processing unit 29 utilizes the $SINR_{eff}(t)$ of Equation 2 to estimate short term radio link quality as a function of time:

$$Q(t) = f(SINR_{eff}(t)) \qquad \text{Equation 3}$$

For example, according to one embodiment, the PHY processing unit 29 utilizes a "hard decision" method of comparing $SINR_{eff}(t)$ to one or more threshold values to determine a value corresponding to radio link conditions at each time t. In an example embodiment utilizing this method, the PHY processing unit 29 assigns one (1) to Q(t) for the times t for which the value of $SINR_{eff}$ is less than or equal to a threshold, and assigns zero (0) to Q(t) for the times at which the value of $SINR_{eff}$ is greater than the threshold. That is, in this embodiment, one of two possible values is assigned to Q(t) at each time t based on one threshold value. In another embodiment, the PHY processing unit 29 selects a value for Q(t) from a set of values (eg., a set of three values, a set of four values, a set of five values, etc.) at each time t based on a comparison of $SINR_{eff}(t)$ at each time t to a plurality of threshold values. Further, according to one embodiment, each of the one or more threshold values is set to a certain value that does not change during operation. Alternatively, in another embodiment, at least one of the one or more threshold values is updated periodically during operation. For example, in one such embodiment, at least one of the one or more threshold values is updated periodically based on measured channel conditions.

As another example, in another embodiment, the PHY processing unit 29 utilizes a "soft decision" method of utilizing a certain radio link performance metric to determine short term radio link quality at each time t. In one such embodiment, for example, the PHY processing unit 29 calculates probability of detection at each time t based on pre-collected statistics, and utilizes the probability of detection at each time t as the short term metric of radio link quality. Other suitable techniques for determining a short term radio link quality based on the effective $SINR_{eff}(t)$ value are utilized in other embodiments.

In order to prevent false alarm situations (such as discussed above), in various embodiments, the PHY processing unit 29 is configured to calculate an average of the short term radio link quality values over time to determine a long term radio link quality value. In some embodiments, calculating an average of the short term radio link quality values corresponds to applying a finite impulse response (FIR) filter to a number of short term radio link quality values. For example, in one such embodiment, a "moving average" of L short term radio link quality values is calculated using an equal weight FIR filter according to:

$$\overline{Q}(t) = \frac{1}{L}\sum_{\tau=0}^{L-1} Q(t-\tau) \qquad \text{Equation 4}$$

As just another example, in another embodiment, the PHY processing unit 29 calculates a "one tap filtering" average according to:

$$\overline{Q}(t) = (1-\beta)\overline{Q}(t-1) + \beta Q(t) \qquad \text{Equation 5}$$

where β is a filter coefficient. Equation 5 corresponds to applying an infinite impulse response (IIR) filter to the short term radio link quality values over time. Other suitable techniques are utilized to determine a long term radio link quality value based on a short term radio link quality in other embodiments.

In order to determine whether the radio link has failed or recovered, the PHY processing unit 29 then compares the long term radio link quality $\overline{Q}(t)$ to a threshold and indicates that the link has failed if the value of $\overline{Q}(t)$ is lower that the threshold, or that a failed radio link has recovered if the value of $\overline{Q}(t)$ is greater than the threshold, according to an embodiment. As an example, in one such embodiment, the PHY processing unit 29 assigns one (1) to a radio link failure (RLF) indicator if value of $\overline{Q}(t)$ is less than or equal to the threshold, and assigns zero (0) to the RLF indicator if the value of $\overline{Q}(t)$ is greater than the threshold.

Figure 3:
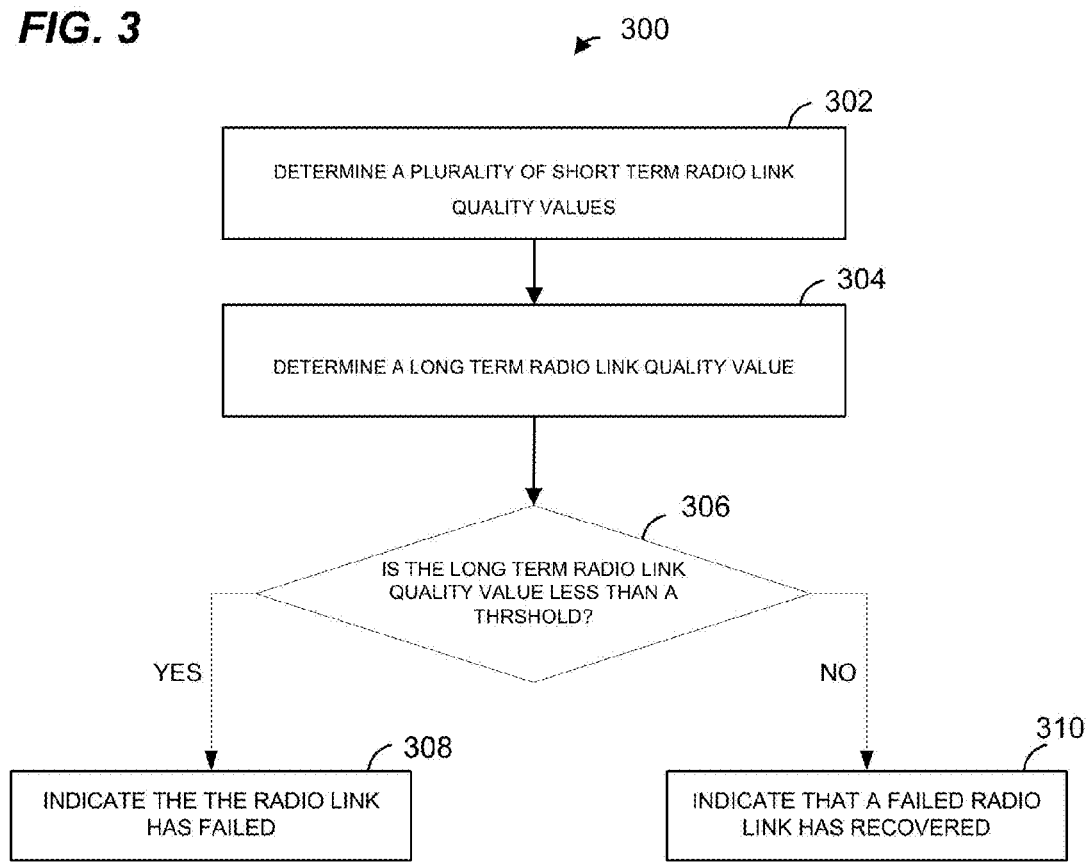
FIG. 3 is a flow diagram of an example method for radio link monitoring in a wireless communication system, according to an embodiment.

FIG. 3 is a flow diagram of an example method 300 for radio link detection in a wireless communication system, according to an embodiment. With reference to FIG. 1, the method 300 is implemented by the network interface 27, in an embodiment. For example, in one such embodiment, the PHY processing unit 29 is configured to implement the method 300. In other embodiments, the method 300 is implemented by another suitable device. At block 302, a plurality of short term radio link quality values is determined. The plurality of short term radio link quality values corresponds to the radio link quality at a plurality of times t, according to an embodiment. For example, the plurality of short term radio link values is determined based on a plurality of effective values $SINR_{eff}(t)$ associated with the radio link as discussed above with reference to Equation 3, in an embodiment.

At block 304, a long term radio link quality is determined based on the plurality of short term radio link values. In some embodiments, a long term radio link quality value is determined by filtering a number of short term radio link quality values with a finite impulse response (FIR) filter. For example, in one such embodiment, an equal weight FIR filter is used to calculate a moving average of the short term radio link quality values according to Equation 4. As another example, in another embodiment, a long term radio link quality value is determined by filtering the short term radio link quality values with an infinite impulse response (IIR) filter. In one embodiment, the long term radio link quality value is determined based on one tap filtering average as in Equation 5.

At block 306, the long term radio link quality value is compared to a threshold. If the long term radio link quality value for an active link is below a threshold, it is indicated that the link has failed at block 308. On the other hand, if the radio link quality is equal to or above the threshold, a failed linked is indicated to be recovered at block 310.

Figure 4:
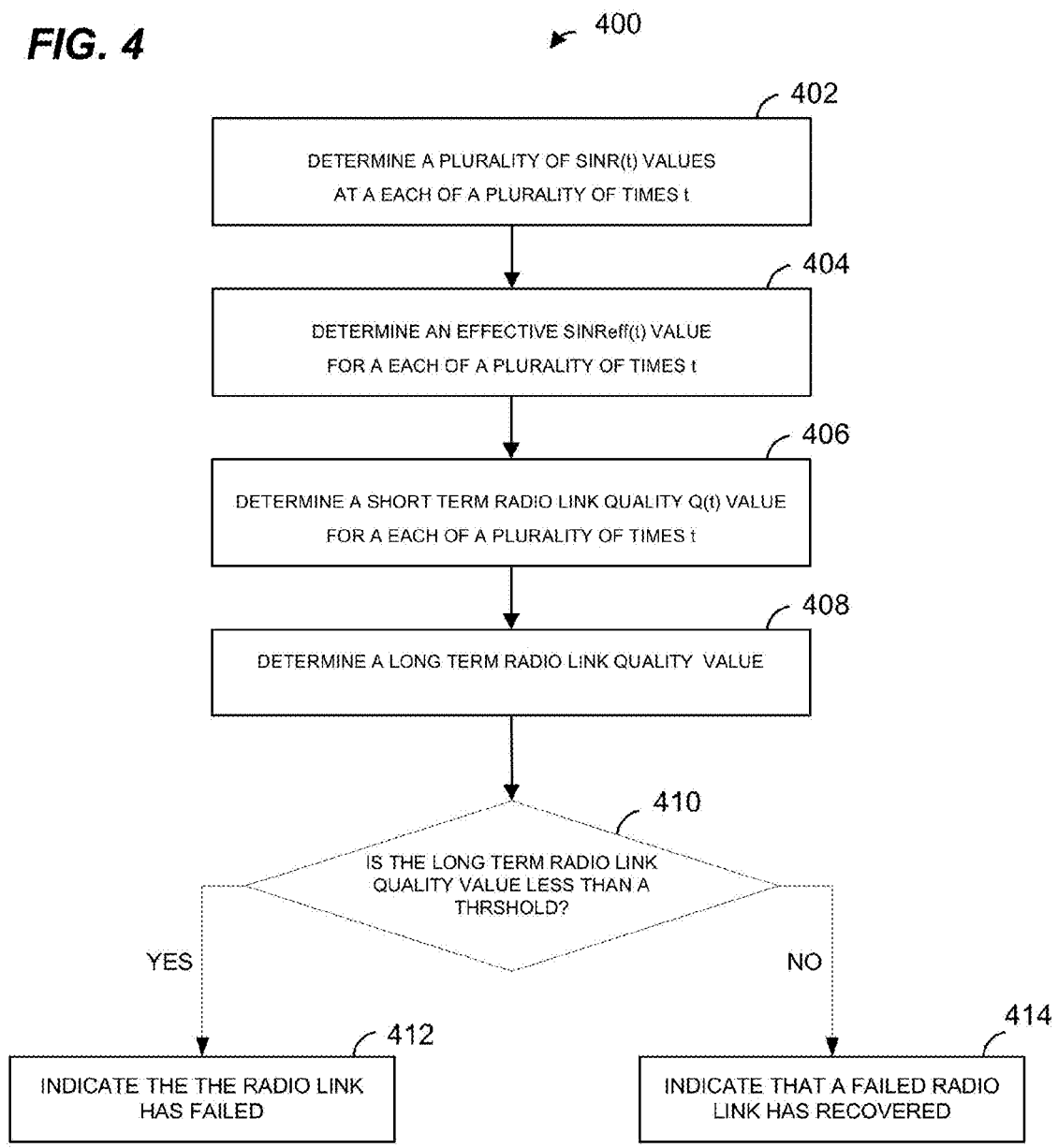
FIG. 4 is a flow diagram of another example method for radio link monitoring in a wireless communication system, according to another embodiment.

FIG. 4 is a flow diagram of another example method 400 for radio link detection in a wireless communication system, according to another embodiment. With reference to FIG. 1, the method 400 is implemented by the network interface 27, in an embodiment. For example, in one such embodiment, the PHY processing unit 29 is configured to implement the method 400. In other embodiments, the method 400 is implemented by another suitable device.

At block 402, a plurality of SINR(t) values is determined for each of a plurality of times t. For example, a plurality of SINR(t) values is determined based on a plurality of effective channel matrices H̃(t) discussed above with reference to FIG. 2, in an embodiment.

At block 404, a plurality of effective $SINR_{eff}(t)$ values is determined for each of a plurality of times t. For example, exponential effective SNR mapping (EESM) of Equation 1 is used to determine the plurality of effective $SINR_{eff}(t)$ values, in an embodiment. As another example, the plurality of effective $SINR_{eff}(t)$ values is determined by calculating a linear average of the SINR(t) values according Equation 2, in another embodiment.

At block 406, a plurality of short term radio link quality values is determined for each time t based the plurality of effective $SINR_{eff}(t)$ values. For example, the "hard decision" method discussed above with reference to Equation 3 is used to determine the plurality of short term radio link quality values, in an embodiment. As another example, the "soft decision" method discussed above with reference to Equation 3 is used to determine the plurality of short term radio link quality values, in an embodiment.

At block 408, a long term radio link quality value is determined based on a plurality of short term radio link quality values. For example, Equation 4 is used to calculate a moving average of a plurality of short term radio link quality values to determine a long term radio link quality value, in an embodiment. In another embodiment, a different type of FIR filter is applied to a plurality of short term quality values. As another example, Equation 5 is used to calculate a one-tap filtering average to determine a long term radio link quality value, in an embodiment.

At block 410, the long term radio link quality value is compared to a threshold. If the long term radio link quality value for an active link is below a threshold, it is indicated that the link has failed at block 412. On the other hand, if, for example, the radio link quality is equal to or above the threshold, a failed linked is indicated to be recovered at block 414.

Figure 5:
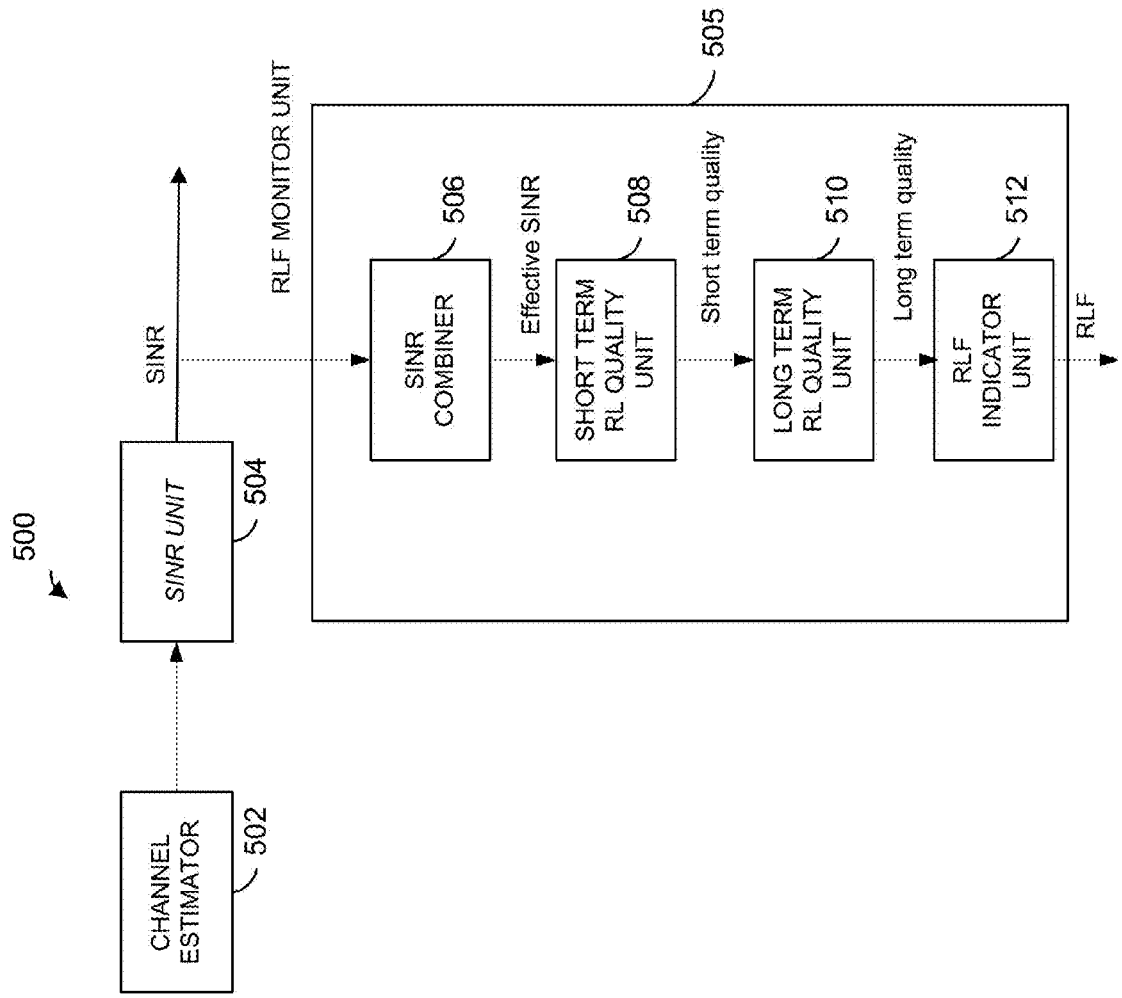
FIG. 5 is a block diagram of an example radio link monitoring unit for implementing radio link monitoring, according to an embodiment.

FIG. 5 is a block diagram of an example radio link processing unit 500 that implements one or more of the example radio link detection methods of FIGS. 3-4, according to an embodiment. Referring to FIG. 1, the radio link processing unit 500 is included in the PHY processing unit 29, according to an embodiment.

The radio link processing unit 500 includes a channel estimator 502 which is configured to perform channel measurements and to generate a plurality of channel matrices associated with the channel. The channel estimator 502 is coupled to an SINR unit 504. The SINR unit 504, which performs channel matrix processing to generate a plurality of SINR values, in an embodiment, is coupled to a radio link (RL) monitor unit 505. The RL monitor unit 505 includes an SINR combiner unit 506, a short term radio link (RL) quality unit 508, a long term radio link (RL) unit 510 and an RLF indicator unit 512.

The SINR combiner unit 506 receives the multiple SINR values generated by the SINR unit 504 and generates, for each time t, an effective $SINR_{eff}$ value. For example, in an embodiment, the SINR combiner unit 506 generates an effective $SINR_{eff}$ values according to Equation 2. The short term RL quality unit 508 receives the effective $SINR_{eff}$ values from the SINR combiner and generates a short term quality value corresponding to each one of the $SINR_{eff}$ values. In some embodiments, the short term RL quality unit is configured to perform the "hard decision" method or the "soft decision" method, both described above with reference to Equation 3, to generate a short term quality values.

The long term RL quality unit 510 processes the short term quality values to generate a long term quality value. In one embodiment, the long term quality unit 510 is configured to calculate a "moving average" of short term radio link quality values according to Equation 4. In another embodiment, the long term quality unit 510 is configured to calculate a "one tap filtering" average of the short term quality values according to according to Equation 5.

The RLF indicator unit 512 receives the long term quality value and indicates that a radio link failure occurred, or that a failed radio link has recovered, when appropriate. In an embodiment, the RLF indicator unit 512 includes a comparator (not shown) that compares the long term quality value to a threshold and indicates that a failure occurred if the long term quality value is below the threshold.

Figure 6:
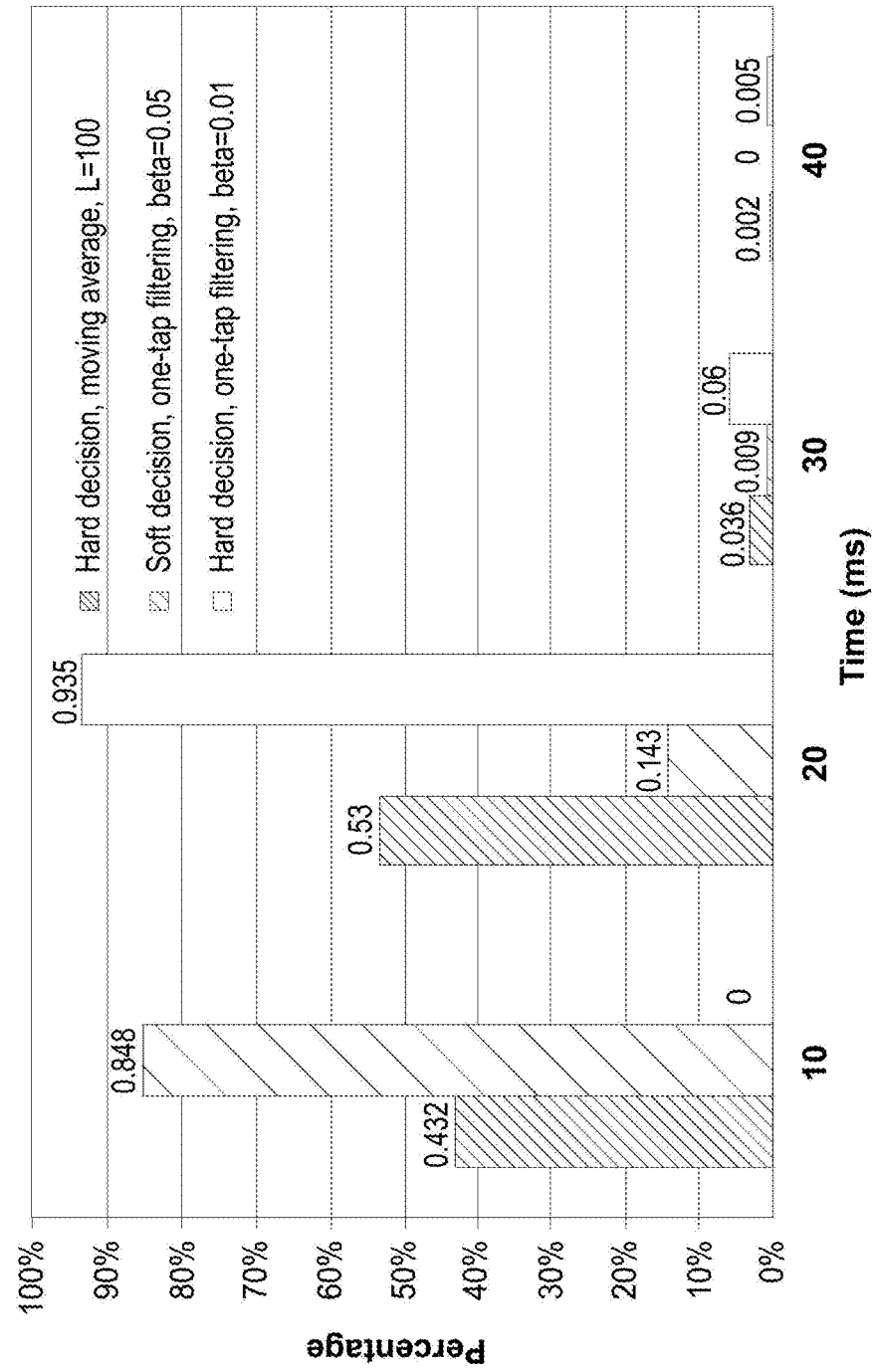
FIG. 6 is a diagram of simulated performance results for radio link monitoring techniques in various embodiments.

FIG. 6 illustrates simulated performance results for various radio link monitoring techniques according to the present disclosure. As can be seen in the FIG. 6, simulations have shown that radio link failure detection in systems utilizing the techniques described herein occur within 40 ms of the time when the failure occurred, which is well below the 200 ms requirement instituted by the 3GPP LTE Standard.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for monitoring a radio link in a wireless communication system, the method comprising:
   determining a plurality of short term radio link quality values based on one or more measured channel matrices, wherein each channel matrix corresponds to a communication channel between one or both of i) multiple transmit antennas and at least one receive antenna, and/or ii) at least one transmit antenna and multiple receive antennas;
   determining a long term radio link quality value from the plurality of the short term radio link quality values; and
   indicating that the radio link has failed or has recovered, when appropriate, based on the long term radio link quality value.

2. A method according to claim 1, wherein determining the long term radio link quality value comprises filtering the short term radio link quality values with a finite impulse response (FIR) filter.

3. A method according to claim 1, wherein determining the long term radio link quality value comprises filtering the short term radio link quality values with an infinite impulse response (IIR) filter.

4. A method according to claim 1, wherein indicating that the radio link has failed or has recovered comprises comparing the long term radio link quality value to a threshold.

5. A method according to claim 1, wherein:
   determining the plurality of short term radio link quality values comprises
   (i) for each of a plurality times t, determining a plurality of signal to interference plus noise (SINR(t)) values associated with one or more spatial streams in a communication channel,
   (ii) for each of the plurality of times t, determining an effective $SINR_{eff}(t)$ value based on a corresponding plurality of SINR(t) values, and
   (iii) for each of the plurality of times t, determining a short term radio link quality Q(t) value based on a corresponding effective $SINR_{eff}(t)$ value; and
   wherein determining the long term radio link quality value is based on multiple short term radio link quality Q(t) values at a plurality of times t.

6. A method according to claim 5, wherein determining an effective $SINR_{eff}(t)$ value based on a corresponding plurality of SINR(t) values comprises calculating an average of the corresponding plurality of SINR(t) values.

7. A method according to claim 5, wherein determining an effective $SINR_{eff}(t)$ value based on a corresponding plurality of SINR(t) values comprises (i) determining a new set of values, wherein each value in the new set of values corresponds to one value in a corresponding plurality of the SINR(t) values, and (ii) calculating an average of the new set of values.

8. A method according to claim 5, wherein determining a short term radio link quality Q(t) value comprises selecting a Q(t) value from a set of values at each time t based on a comparison of the corresponding effective $SINR_{eff}(t)$ value at each time t to one or more threshold values.

9. A method according to claim 5, wherein determining a short term radio link quality Q(t) value comprises determining a radio link performance metric at each time t based on the corresponding effective $SINR_{eff}(t)$ value.

10. A method according to claim 5, wherein determining a long term radio link quality value based on the multiple short term radio link quality values comprises filtering the short term radio link quality values at a plurality of times t using a finite impulse response (FIR) filter.

11. A method according to claim 5, wherein determining a long term radio link quality value comprises filtering short term radio link quality values at a plurality of times t using an infinite impulse response (IIR) filter.

12. An apparatus for monitoring a radio link in a wireless communication system, the apparatus comprising:
   a processor configured to:
      determine a plurality of short term radio link quality values based on one or more measured channel matrices, wherein each channel matrix corresponds to a communication channel between one or both of i) multiple transmit antennas and at least one receive antenna, and/or ii) at least one transmit antenna and multiple receive antennas;
      determine a long term radio link quality value from the plurality of the short term radio link quality values; and
      indicate that the radio link has failed or has recovered, when appropriate, based on the long term radio link quality value.

13. An apparatus according to claim 12, wherein the processor is configured to determine the long term radio link condition value by filtering the short term radio link quality values with a finite impulse response (FIR) filter.

14. An apparatus according to claim 12, wherein the processor is configured to determine the long term radio link condition value by filtering the short term radio link quality values with an infinite impulse response (IIR) filter.

15. An apparatus according to claim 12, wherein the processor is configured to indicate that the radio link has failed or has recovered by comparing the long term radio link condition value to a threshold.

16. An apparatus according to claim 12, wherein the processor comprises:
   a signal to interference plus noise (SINR) unit configured to determine a plurality of signal to interference plus noise (SINR(t)) values associated with one or more spatial streams in a communication channel for each of a plurality of times t;
   an SINR combiner unit to determine an effective $SINR_{eff}(t)$ value based on a corresponding plurality of SINR(t) values for each of the plurality of times t;
   a short term radio link quality unit configured to determine a short term radio link quality Q(t) value based on a corresponding effective $SINR_{eff}(t)$ value for each of the plurality of times t;
   a long term radio link quality unit configured to determine a long term radio link quality value based on multiple short term radio link quality Q(t) values at a plurality of times t; and
   a radio link failure indicator configured to indicate radio link failure or recovery, when appropriate, based on the long term radio link quality value.

17. An apparatus according to claim 16, wherein the SINR combiner unit is configured to determine an effective $SINR_{eff}(t)$ value by calculating an average of the corresponding plurality of SINR(t) values.

18. An apparatus according to claim 16, wherein the SINR combiner unit is configured to determine an effective $SINR_{eff}(t)$ value by (i) determining a new set of values, wherein each value in the new set of values corresponds to one value in a corresponding plurality of the SINR(t) values, and (ii) calculating an average of the new set of values.

19. An apparatus according to claim 16, wherein the short term radio link quality unit is configured to select a short term radio link quality Q(t) value from a set of values at each time t based on a comparison of the corresponding effective $SINR_{eff}(t)$ value at each time t to one or more threshold values.

20. An apparatus according to claim 16, wherein the short term radio link quality unit is configured to determine a short term radio link quality Q(t) value by determining a radio link quality metric at each time t based on the corresponding effective $SINR_{eff}(t)$ value.

21. An apparatus according to claim 16, wherein the long term radio link quality unit is configured to determine a long term radio link quality value based on filtering a plurality of short term radio link quality values with a finite impulse response (FIR) filter.

22. An apparatus according to claim 16, wherein the long term radio link quality unit is configured to determine a long term radio link quality value based on filtering a plurality of short term radio link quality values with an infinite impulse response (IIR) filter.

23. An apparatus according to claim 16, wherein the radio link failure indicator unit is configured to indicate radio link failure or recovery based on comparing the long term channel quality value to a threshold.

24. An apparatus according to claim 12, wherein the processor comprises one or more integrated circuit devices.

25. An apparatus according to claim 12, wherein the processor is configured to execute computer-readable instructions stored in a memory.

\* \* \* \* \*